US009666840B2

(12) United States Patent
Sakai et al.

(10) Patent No.: US 9,666,840 B2
(45) Date of Patent: May 30, 2017

(54) CELL MODULE

(71) Applicant: KABUSHIKI KAISHA TOYOTA JIDOSHOKKI, Aichi-ken (JP)

(72) Inventors: Takashi Sakai, Kariya (JP); Takayuki Kato, Kariya (JP); Hiromi Ueda, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 15/303,326

(22) PCT Filed: Feb. 26, 2015

(86) PCT No.: PCT/JP2015/055644
§ 371 (c)(1),
(2) Date: Oct. 11, 2016

(87) PCT Pub. No.: WO2015/162996
PCT Pub. Date: Oct. 29, 2015

(65) Prior Publication Data
US 2017/0033332 A1 Feb. 2, 2017

(30) Foreign Application Priority Data
Apr. 21, 2014 (JP) .................. 2014-087137

(51) Int. Cl.
*H01M 2/10* (2006.01)
*H01M 2/20* (2006.01)
*H01M 10/0525* (2010.01)

(52) U.S. Cl.
CPC .......... *H01M 2/1016* (2013.01); *H01M 2/10* (2013.01); *H01M 2/20* (2013.01); *H01M 2/204* (2013.01);
(Continued)

(58) Field of Classification Search
None
See application file for complete search history.

(56) References Cited

U.S. PATENT DOCUMENTS

| 2009/0053591 A1 | 2/2009 | Ikeda et al. |
| 2011/0027630 A1 | 2/2011 | Tsutsumi et al. |
| 2012/0177958 A1 | 7/2012 | Tsutsumi et al. |

FOREIGN PATENT DOCUMENTS

| JP | 2008-251352 | 10/2008 |
| JP | 2008-300083 | 12/2008 |

(Continued)

OTHER PUBLICATIONS

International Search Report, along with English-language translation thereof, for PCT/JP2015/055644 dated May 12, 2015.
(Continued)

*Primary Examiner* — Sarah A Slifka
(74) *Attorney, Agent, or Firm* — Greenblum & Bernstein, P.L.C.

(57) ABSTRACT

A battery module has aligned battery cells, two plate members provided on the opposite ends in the aligning direction of the battery cells, fasteners joined to the plate members to integrate the battery cells, at least one connection bus bar, which connects terminals of adjacent battery cells in the aligning direction, and an elastic member, which absorbs expansion of the battery cells in the aligning direction. Each connection bus bar includes two connection portions connected to the terminals and a bend portion located between the two connection portions. In response to expansion in the aligning direction of the battery cells, the bend portion is extendable in the aligning direction. A total allowed deformation amount, which is based on the allowed deformation amount of the bend portions in the aligning direction, is set
(Continued)

to be greater than or equal to the thickness in the aligning direction of the elastic member.

7 Claims, 5 Drawing Sheets

(52) U.S. Cl.
CPC ....... *H01M 2/206* (2013.01); *H01M 10/0525* (2013.01)

(56) References Cited

FOREIGN PATENT DOCUMENTS

| | | |
|---|---|---|
| JP | 2009-48973 | 3/2009 |
| JP | 2009-182001 | 8/2009 |
| JP | 2010-67582 | 3/2010 |
| JP | 2010-92833 | 4/2010 |
| JP | 2010-192419 | 9/2010 |
| JP | 2011-233491 | 11/2011 |
| JP | 2012-181977 | 9/2012 |
| JP | 2013-165067 | 8/2013 |
| JP | 2014-63750 | 4/2014 |

OTHER PUBLICATIONS

Written Opinion of the International Searching Authority, along with English-language translation thereof, for PCT/JP2015/055644 dated May 12, 2015.

International Preliminary Report on Patentability, along with English-language translation thereof, for PCT/JP2015/055644 dated Oct. 25, 2016.

ns of adjacent ones of the battery cells to each other. The elastic member absorbs expansion in the aligning direction of the battery cells. The at least one connection bus bar includes two connection portions connected to the terminals and a bend portion, which is provided between the connection portions and is extendable in the aligning direction in accordance with expansion in the aligning direction of the battery cells. A total allowed deformation amount is set based on an allowed deformation amount in the aligning direction of the bend portion. The total allowed deformation amount is set to be greater than or equal to a thickness in the aligning direction of the elastic member.

CELL MODULE

TECHNICAL FIELD

The present invention relates to a battery module in which battery cells are integrated, and more particularly, to a single battery module in which terminals of battery cells are connected together by connection bus bars.

BACKGROUND ART

Patent Document 1 discloses a battery capable of absorbing forces generated between adjacent cells.

The battery disclosed in Patent Document 1 includes three rectangular parallelepiped cells. Each cell includes a positive terminal provided on the upper surface. The positive terminal includes pillar-shaped first-stage stacked portions with flat upper surfaces and columnar second-stage stacked portions provided on the first-stage stacked portions.

Also, the battery disclosed in Patent Document 1 includes connection bars each electrically connecting the positive terminals of two adjacent cells. Each connection bar has two circular through-holes, which are fitted to the second-stage stacked portions of the positive terminals of two adjacent cells.

Each connection bar is formed by curving the section between the two through-holes into a bulging shape (an inverted U shape).

In the battery disclosed in Patent Document 1, two adjacent cells are connected together by a connection bar with a bulging section. Thus, the bulging section absorbs deformation in the direction of connection of the two cells (for example, thermal expansion) and external forces (for example, vibrations).

Therefore, the use of such a connection bar in the battery reduces load applied to the terminals of the two cells.

PRIOR ART DOCUMENT

Patent Document

Patent Document 1: Japanese Laid-Open Patent Publication No. 2010-67582

SUMMARY OF THE INVENTION

Problems that the Invention is to Solve

However, in the battery disclosed in Patent Document 1, if expansion in the aligning direction of the cells exceeds the deformable range of the connection bars, the connection bars apply excessive load in the aligning direction to the terminals of the cells, which may deform or break the terminals.

Accordingly, it is an objective of the present invention to provide a battery module that prevents terminals of aligned battery cells from receiving excessive load in the aligning direction when the battery cells expand.

Means for Solving the Problems

To achieve the foregoing objective and in accordance with one aspect of the present invention, a battery module is provided that includes a plurality of aligned battery cells, two plate members each arranged at one of opposite ends in an aligning direction of the battery cells, fasteners provided in the plate members, at least one connection bus bar, and an elastic member. The fasteners integrate the battery cells. The

MODES FOR CARRYING OUT THE INVENTION

First Embodiment

A battery module according to a first embodiment of the present invention will now be described with reference to the drawings.

The present embodiment illustrates a battery module used for a lithium-ion rechargeable battery, which is a non-aqueous electrolyte rechargeable battery.

Figure 1:
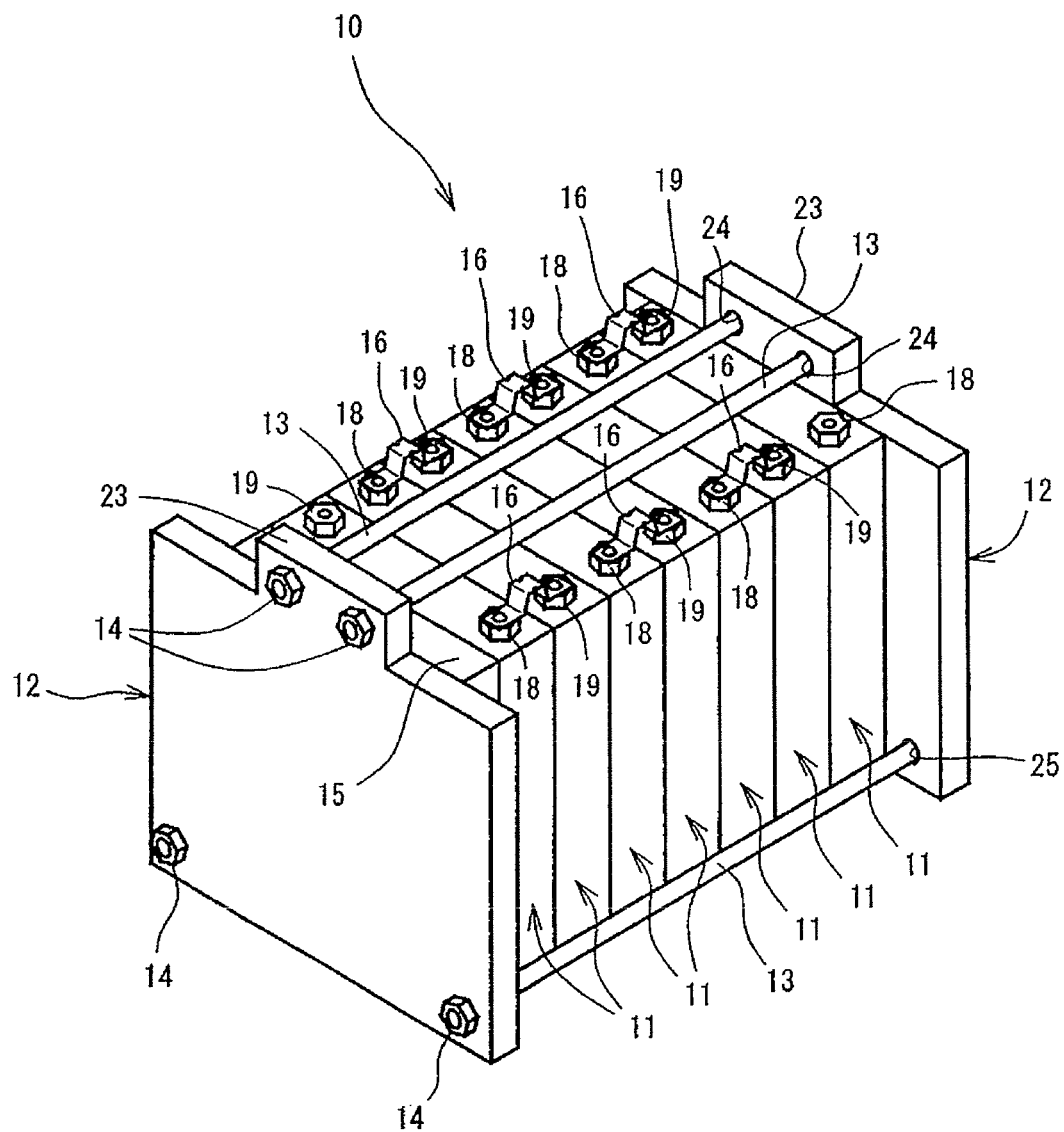
FIG. 1 is a perspective view schematically illustrating a battery module according to a first embodiment of the present invention.

As shown in FIG. 1, a battery module 10 includes aligned battery cells 11 (seven in the present embodiment), a pair of plate members 12, bolts 13, and nuts 14. The plate members 12 are arranged on the opposite ends in the aligning direction of the battery cells 11. The bolts 13 and nuts 14 function as fasteners that integrate the battery cells 11.

The battery module 10 includes a single elastic member 15, which absorbs expansion in the aligning direction of the battery cells 11, and connection bus bars 16, which connect terminals of adjacent battery cells 11 together.

The battery cells 11 of the present embodiment are rectangular parallelepiped lithium batteries and have positive terminals 18 and negative terminals 19, which are terminals of the battery cells 11. The battery cells 11 are aligned such that the positive and negative terminals 18, 19 project vertically upward.

Each battery cell 11 incorporates an electrode assembly (not shown). The positive electrode of the electrode assembly is connected to the positive terminal 18 with a positive electrode conductor (not shown).

The negative electrode of the electrode assembly is connected to the negative terminal 19 with a negative electrode conductor (not shown).

Figure 2:
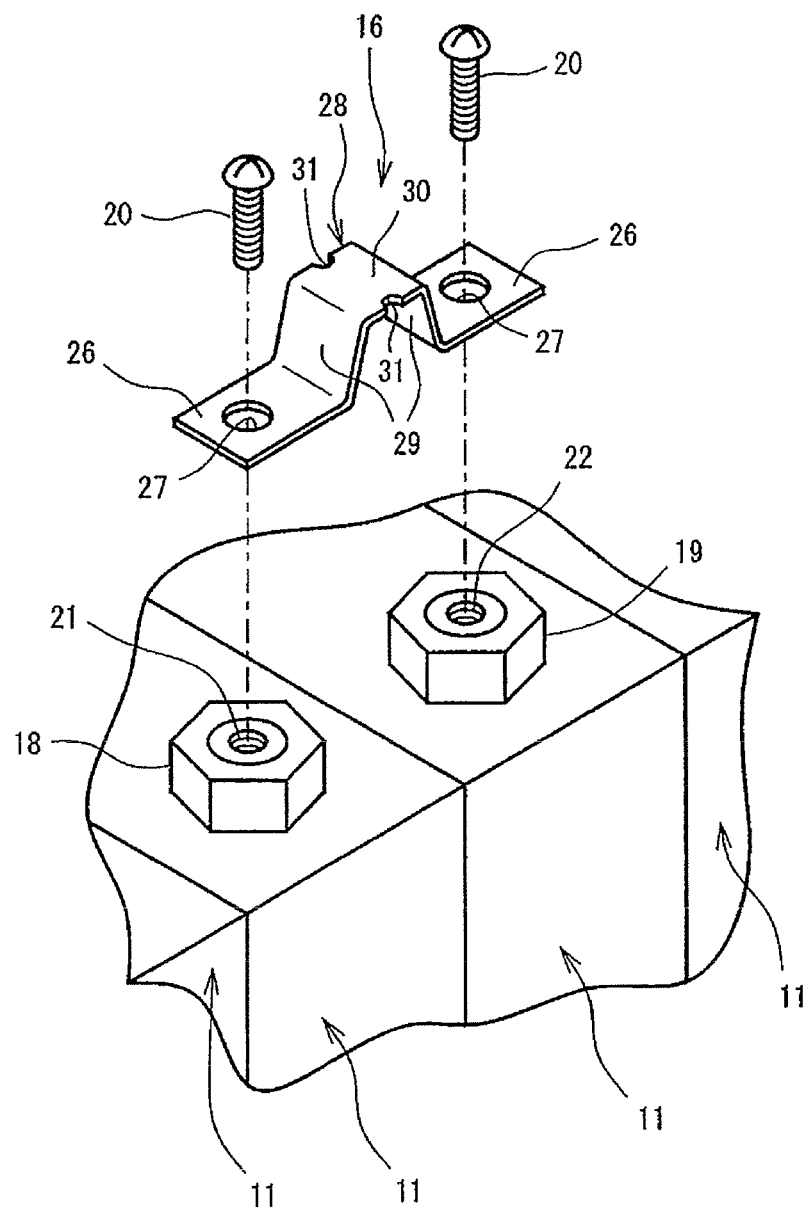
FIG. 2 is an exploded perspective view illustrating part of the battery module.

As shown in FIG. 2, the positive terminal 18 of the present embodiment has an internal thread portion 21, to which a fixing bolt 20 for fixing a connection bus bar 16 is threaded. Likewise, the negative terminal 19 has an internal thread portion 22, to which a fixing bolt 20 is threaded.

A plate member 12 is provided on either end in the aligning direction of the set of the battery cells 11.

Each plate member 12 is substantially rectangular and has a protrusion 23 on one of the four sides.

The protrusion 23 has a pair of through-holes 24.

Each plate member 12 has two through-holes 25 each at either end of the side opposite to the side on which the protrusion 23 is located.

The plate members 12 are arranged such that the protrusions 23 protrude vertically upward.

The bolts 13 and nuts 14 function to integrate the battery cells 11.

In the present embodiment, the bolts 13 are passed through the through-holes 24, 25, and the nuts are threaded to the bolts 13.

By increasing the fastening force of the bolts 13 and nuts 14, pressure is applied to the face of each plate member 12 on the side opposite to the side on which a battery cell 11 is provided, so that the battery cells 11 are integrated.

In the present embodiment, the elastic member 15 is located between one of the plate members 12 and the opposed battery cell 11.

The elastic member 15 is provided to absorb expansion in the aligning direction of the battery cells 11.

Thus, the elastic member 15 is made of an elastically deformable material having a sufficient elasticity.

The thickness C in the aligning direction (FIG. 4) of the elastic member 15 is set by multiplying a predicted maximum expansion amount of each battery cell 11 by the number of the battery cells 11.

The maximum expansion amount refers to a rated maximum expansion amount that is permitted in an adequate or normal use condition of the battery cell 11. Thus, the maximum expansion amount does not cover the expansion amount in a condition in which the battery cells 11 have abnormalities due to failure or the expansion amount in a use condition under an inappropriate environment.

Even if the respective battery cells 11 expand to the maximum expansion amount, the expansion of the battery cells 11 is absorbed by the elastic member 15.

In the present embodiment, the battery cells 11 are connected in series with the connection bus bars 16.

The connection bus bars 16 are made of metal plates with good conductivity. In the present embodiment, the connection bus bars 16 are made of tin-plated copper plates.

As shown in FIG. 2, each connection bus bar 16 is made of a rectangular plate. The connection bus bar 16 has two connection portions 26 at the opposite ends in the longitudinal direction. Each connection portion has a through-hole 27.

The connection portions 26 each contact a positive terminal 18 or a negative terminal 19.

Each through-hole 27 receives a fixing bolt 20 when the connection bus bar 16 is fixed to a positive terminal 18 or a negative terminal 19.

A bend portion 28, which has an upward protruding shape, is provided between the connection portions 26. Specifically, the bend portion 28 has a trapezoidal shape.

Figure 3A:
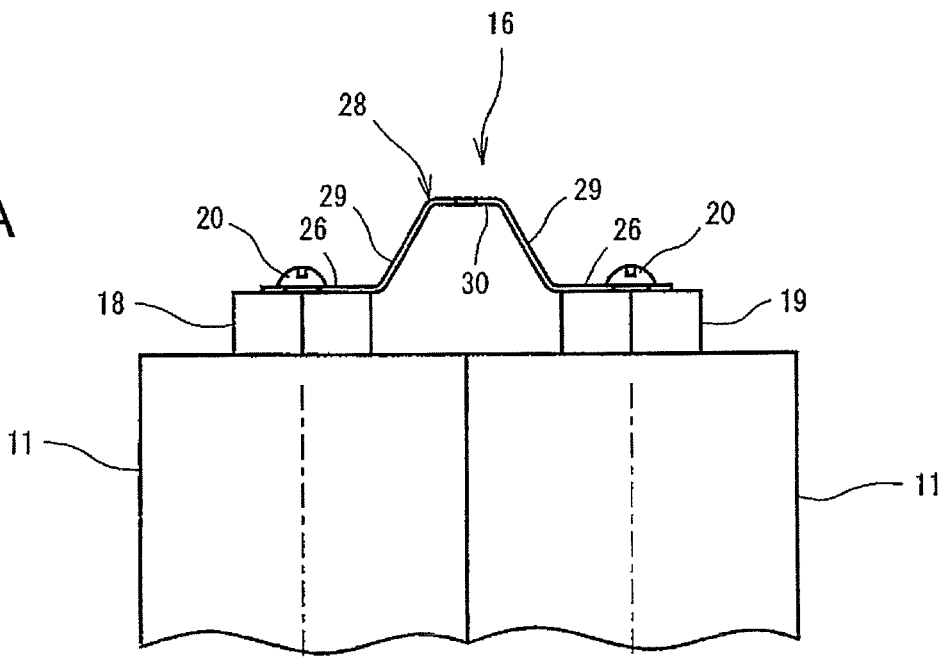
FIG. 3A is a partial side view illustrating a connection bar on battery cells that have not expanded.

As shown in FIGS. 2 and 3A, the bend portion 28 of the present embodiment is formed by bending the connection bus bar 16. The bend portion 28 has two inclined walls 29, which are inclined relative to the connection portions 26, and a parallel wall 30, which is provided between the inclined walls 29 and parallel with the connection portions 26.

The bend portion 28 is configured to set an allowed deformation amount A of the connection bus bar 16 and is designed to be easily deformed.

Figure 3B:
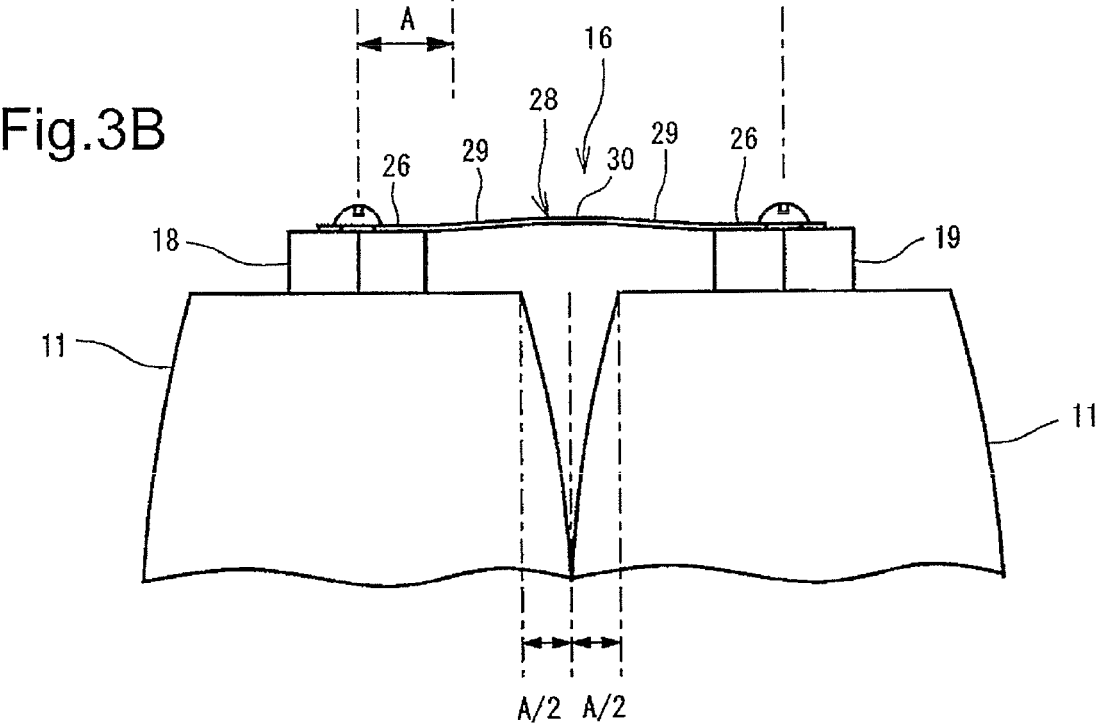
FIG. 3B is a partial side view illustrating a connection bar on battery cells that have expanded.

As shown in FIG. 3B, when expansion in the aligning direction of the battery cells 11 increases the distance in the aligning direction between the positive terminal 18 and the adjacent negative terminal 19, the bend portion 28 is extended in the aligning direction to be deformed. Specifically, the bent sections of the bend portion 28 are deformed to be unfolded, which increases the length in the aligning direction of the bend portion 28.

That is, the bend portion 28 is extendable in the aligning direction in accordance with expansion in the aligning direction of the battery cells 11.

Figure 4A:
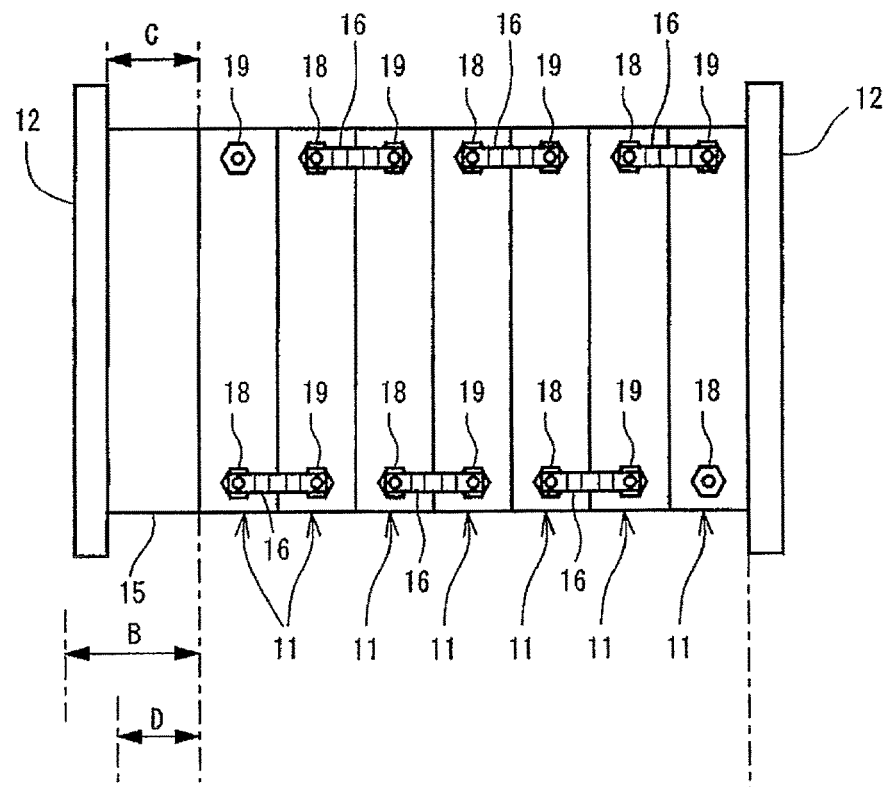
FIG. 4A is a schematic plan view illustrating a battery module having battery cells that have not expanded.

As shown in FIG. 4A, the allowed deformation amount A of the connection bus bar 16 shown in FIG. 3B sets a total allowed deformation amount B, which corresponds to the number of the connection bus bars 16 in the battery module 10.

The total allowed deformation amount B is set by taking into consideration the maximum expansion amount of the battery cell 11.

In the present embodiment, the total sum of the allowed deformation amounts A of the connection bus bars 16 (A×6 bus bars) corresponds to the total allowed deformation amount B and is set to be greater than the thickness C in the aligning direction of the elastic member 15. The thickness C of the elastic member 15 is an initial thickness before the elastic member 15 is elastically deformed.

Figure 4B:
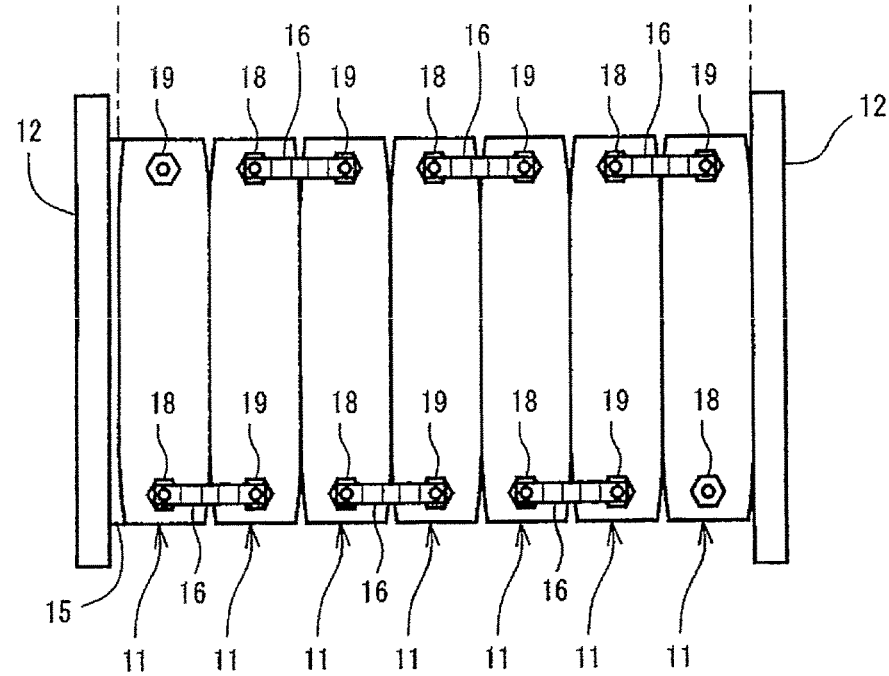
FIG. 4B is a schematic plan view illustrating a battery module having battery cells that have expanded.

Even when the elastic member 15 is maximally elastically deformed by expansion in the aligning direction of the battery cells 11 as shown in FIG. 4B, the bend portions 28 of the connection bus bars 16 remain deformable.

In the present embodiment, two semicircular notches 31 are provided on the opposite sides of the parallel wall 30 of each bend portion 28 (see FIG. 2).

The notches 31 are provided to allow the connection bus bar 16 to be easily broken when the battery cells 11 abnormally, that is, excessively, expand beyond the allowable maximum expansion amount due to abnormality such as a failure.

Thus, the notches 31 are formed by cutouts extending in a direction orthogonal to the aligning direction of the battery cells 11, so that, when the battery cells 11 expand abnormally, that is, excessively, stress is concentrated on the opposite sides of the parallel wall 30.

Expansion of the battery cells 11 in the battery module 10 of the present embodiment will now be described.

FIG. 4A illustrates the battery module 10 in a state in which the battery cells 11 have not expanded, and FIG. 4B illustrates the battery module 10 in a state in which the battery cells 11 have expanded.

The battery cells 11 may expand in the aligning direction due to deterioration over an extended period of use. Also, charging/discharging may cause the battery cells 11 to expand and contract in the aligning direction.

Gradual expansion of the battery cells 11 due to aging deterioration not only increases the thickness of the battery cells 11 in the aligning direction, but also increases the distance between the positive terminals 18 and the negative terminals 19 of adjacent battery cells 11.

In response to the expansion of the battery cells 11, the elastic member 15 contracts in the aligning direction to absorb the expansion of the battery cells 11.

If the respective battery cells 11 evenly expand as shown in FIG. 4B, a total expansion amount D of the battery module 10 is obtained by multiplying the expansion amount in the aligning direction of each battery cell 11 by the number (seven) of the battery cells 11.

When the total expansion amount D of the battery cells 11 is less than or equal to the thickness C in the aligning direction of the elastic member 15, the following relationship is satisfied: Total allowed deformation amount B>Elastic member thickness C>Total expansion amount D.

Expansion in the aligning direction of the battery cells 11 increases the distance in the aligning direction between the positive terminals 18 and the negative terminals 19 of adjacent battery cells 11, which deforms the connection bus bars 16.

Specifically, as shown in FIG. 3B, the bend portion 28 of the connection bus bar 16 is deformed such that the connection portions 26 are moved away from each other. At the same time, the inclined walls 29 of the bend portion 28 become less inclined.

The deformation of the bend portion 28 prevents the positive terminal 18 and the negative terminal 19 from receiving excessive load in the aligning direction.

If the battery cells 11 should expand to an extent greater than the allowed deformation amount A of the connection bus bar 16 of the bend portion 28, the positive terminal 18 and the negative terminal 19 receive an increased load in the aligning direction.

However, when the load in the aligning direction acting on the positive terminal 18 and the negative terminal 19 is increased, stress concentrates on the notches 31 in the parallel wall 30, so that the connection bus bar 16 is broken before excessive load acts on the positive terminal 18 and the negative terminal 19.

The battery module of the present embodiment achieves the following advantages.

(1) The total allowed deformation amount B of the battery module 10, which is based on the allowed deformation amount A of the bend portion 28 of each connection bus bar 16, is set to be greater than the thickness C in the aligning direction of the elastic member 15. Thus, when the expansion amount of the battery cells 11 is within the range absorbable by the elastic member 15, deformation of the bend portion 28 of each connection bus bar 16 is always within the range of the allowed deformation amount A. Therefore, even when the battery cells 11 continue to expand, if the total expansion amount D of the battery cells 11 is within the range absorbable by the elastic member 15, the positive terminals 18 and negative terminals 19 of the battery cells 11 are prevented from receiving excessive load in the aligning direction. As a result, the positive terminals 18 and negative terminals 19 are prevented from being deformed and damaged by expansion of the battery cells 11.

(2) When the battery cells 11 expand beyond the allowed deformation amount A of each connection bus bar 16, stress concentrates on the notches 31 of each connection bus bar 16. Accordingly, the connection bus bar 16 is broken from the notches 31 before the positive terminal 18 and the negative terminal 19 are significantly deformed or broken. Since the connection bus bar 16 is broken, the positive terminal 18 and negative terminal 19 do not receive excessive load in the aligning direction, so that the positive terminal 18 and negative terminal 19 of the battery cells 11 are prevented from being deformed or damaged by expansion of the battery cells 11.

Second Embodiment

A battery module according to a second embodiment will now be described.

The present embodiment is different from the first embodiment in that the connection bus bar is welded to the positive terminal and negative terminal of the battery cells.

In the present embodiment, the explanations of the first embodiment are applied to those components that are the same as the corresponding components of the first embodiment, and the same reference numerals are employed.

Figure 5:
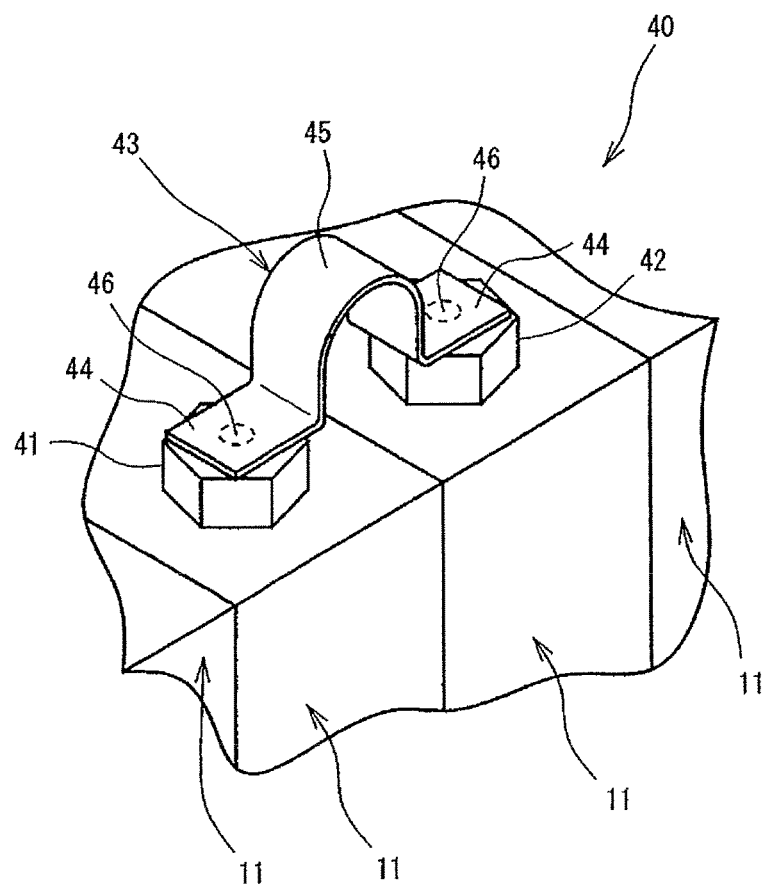
FIG. 5 is a perspective view illustrating part of a battery module according to a second embodiment.

As shown in FIG. 5, a battery module 40 includes battery cells 11, each of which has a positive terminal 41 and a negative terminal 42.

A connection bus bar 43 is welded to the positive terminal 41 and the negative terminal 42 of the battery cells 11.

A bend portion 45, which has a shape protruding upward, is provided between the connection portions 44.

The bend portion 45 of the present embodiment is formed by curving a connection bus bar 43 into an inverted U shape.

As in the first embodiment, the bend portion 45 sets the allowed deformation amount A of the connection bus bar 43, and the total allowed deformation amount B of the battery module 40 is determined based on the allowed, deformation amount A.

In the present embodiment, as shown in FIG. 5, each connection portion 44 has one welded portion 46 at which the connection portion 44 is welded.

Although the connection bus bar 43 is welded to the positive terminal 41 and the negative terminal 42 of the battery cells 11 in the present embodiment, the advantages as those in the first embodiment are achieved.

Third Embodiment

A battery module according to a third embodiment will now be described.

The present embodiment has the same configuration as the first embodiment except that the present embodiment is configured such that, when each connection bus bar is deformed by expansion of the battery cells, slippage between the connection bus bar and the positive electrode and between the connection bus bar and the negative electrode is prevented.

Therefore, the explanations of the first embodiment are applied to the components of the present embodiment, and the same reference numerals are employed.

Figure 6:
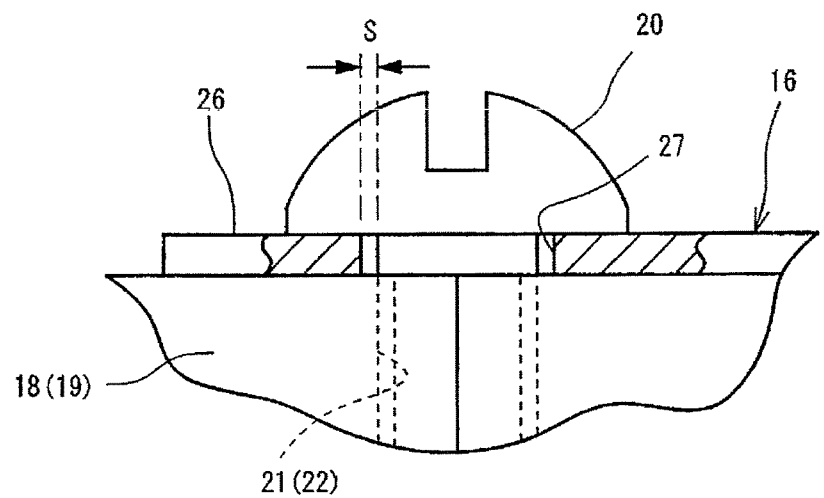
FIG. 6 is an enlarged view illustrating part of a battery module according to a third embodiment.

As shown in FIG. 6, a clearance S exists between the through-hole 27 of the connection bus bar 16 and the received fixing bolt 20.

In the present embodiment, the axial force of the fixing bolt 20 is set such that, when the battery cells 11 expand, the connection bus bar 16 does not slip on the positive terminals 18 or the negative terminals 19.

That is, the axial force of the fixing bolt 20 is set such that a load in the aligning direction that deforms the connection bus bar 16 is smaller than a load in the aligning direction that causes the connection bus bar 16 to slip on the positive terminals 18 and the negative terminals 19.

In the present embodiment, the connection bus bar 16 does not slip on the positive terminal 18 or the negative terminal 19 when the connection bus bar 16 is being deformed even if the battery cells 11 expand.

This prevents the contact resistance from being increased by slippage between the connection bus bar 16 and the positive terminal 18 or between the connection bus bar 16 and the negative terminals 19.

The present invention is not to be limited to the foregoing embodiments, but may be modified as follows within the scope of the invention.

In the above illustrated embodiments, part of the connection bus bar is bent or curved to form a bend portion. The shape of the bend portion is not limited to those in the above illustrated embodiments. The shape of the bend portion is not particularly limited as long as the shape can be obtained by bending or curving and is capable of setting an allowed deformation amount.

In the above illustrated embodiments, the total allowed deformation amount, which is based on the allowed deformation amount of the bend portion of the connection bus bar of the battery module, is set to be greater than the thickness in the aligning direction of the elastic member. However, the total allowed deformation amount may be set to be equal to the thickness in the aligning direction of the elastic member. In this case also, the connection bus bar is deformed when the elastic member is absorbing expansion of the battery cells. Thus, the terminals of the battery cells do not receive an excessive load.

In the above illustrated embodiments, the elastic member is arranged between one of the plate members and the closest battery cell. However, the configuration is not limited to this. For example, the elastic member may be arranged between two battery cells. Alternatively, two or more elastic members may be provided, in which case an elastic member is provided between a plate member and a battery cell, and an additional elastic member is arranged between two battery cells. In the case of two or more elastic members, the sum of the thicknesses in the aligning direction of the elastic members corresponds to the thickness in the aligning direction of the elastic members.

In the above illustrated embodiments, the bend portion of the connection bus bar has a shape protruding upward. However, the bend portion may have a shape protruding downward, for example.

In the above illustrated embodiments, the battery module has six connection bus bars. However, the number of the connection bus bars may be changed in accordance with the number of the battery cells. If the battery module has two battery modules, the number of the connection bus bars is one. In this case, the total allowed deformation amount of the battery module is equal to the allowed deformation amount of the connection bus bars.

In the first embodiment, the connection bus bar has notches. However, the notches may be omitted. The connection bus bar may have no notches as in the second embodiment.

In the above illustrated embodiments, a lithium-ion rechargeable battery, which is a non-aqueous electrolyte rechargeable battery, is illustrated as an example. However, the battery module is not limited to a lithium-ion rechargeable battery. As long as the battery module has battery cells that expand in the aligning direction, the type of batteries is not particularly limited.

The invention claimed is:

1. A battery module comprising:
   a plurality of aligned battery cells;
   two plate members each arranged at one of opposite ends in an aligning direction of the battery cells;
   fasteners provided in the plate members, wherein the fasteners integrate the battery cells;
   at least one connection bus bar, which connects terminals of adjacent ones of the battery cells to each other; and
   an elastic member, which absorbs expansion in the aligning direction of the battery cells, wherein
   the at least one connection bus bar includes
      two connection portions connected to the terminals, and
      a bend portion, which is provided between the connection portions and is extendable in the aligning direction in accordance with expansion in the aligning direction of the battery cells,
   a total allowed deformation amount is set based on an allowed deformation amount in the aligning direction of the bend portion, and
   the total allowed deformation amount is set to be greater than or equal to a thickness in the aligning direction of the elastic member.

2. The battery module according to claim 1, wherein the at least one connection bus bar includes a notch, which is formed by a cutout extending in a direction orthogonal to the aligning direction of the battery cells.

3. The battery module according to claim 2, wherein
   the bend portion includes
      two inclined walls, which are inclined relative to the connection portions, and
      a parallel wall, which is arranged between the inclined walls and parallel with the connection portions, and
   the notch is provided in the parallel wall.

4. The battery module according to claim 1, wherein the bend portion has a shape protruding upward.

5. The battery module according to claim 4, wherein the bend portion has a trapezoidal shape.

6. The battery module according to claim 1, wherein
   the at least one connection bus bar is one of a plurality of connection bus bars, and
   the total allowed deformation amount corresponds to a total sum of the allowed deformation amounts of the connection bus bars.

7. The battery module according to claim 1, wherein, even if the battery cells each expand to a maximum expansion amount, the elastic member absorbs the expansion of the battery cells.

* * * * *